United States Patent [19]

St. Clair

[11] Patent Number: 4,490,090
[45] Date of Patent: Dec. 25, 1984

[54] APPARATUS FOR TRANSPORTING FRAMES

[75] Inventor: Albert R. St. Clair, Lilburn, Ga.

[73] Assignee: Simmons U.S.A. Corporation, Atlanta, Ga.

[21] Appl. No.: 369,317

[22] Filed: Apr. 16, 1982

[51] Int. Cl.³ .............................................. B65H 5/12
[52] U.S. Cl. .................................. 414/567; 414/222; 414/729; 414/740; 198/486; 294/104
[58] Field of Search .............. 269/228, 237; 198/486, 198/403, 409; 414/222-225, 729, 740, 567, 680, 771, 773, 758, 732, 733, 741, 739, 744 A, 751, 24.5, 24.6; 294/104, 106

[56] References Cited

U.S. PATENT DOCUMENTS

| 2,365,007 | 12/1944 | Rideout et al. | 198/403 X |
| 2,934,219 | 4/1960 | Stumpf | 414/758 X |
| 3,314,554 | 4/1967 | Cuniberti | 414/771 X |
| 3,347,349 | 10/1967 | Carlson | 198/403 X |
| 3,945,676 | 3/1976 | Asamoto | 294/106 X |

FOREIGN PATENT DOCUMENTS 1010415  5/1977  Canada .............................. 414/24.6

Primary Examiner—Robert J. Spar
Assistant Examiner—Terrance L. Siemens

[57] ABSTRACT

An apparatus is provided for transferring a wood frame or the like from a first surface to a second surface. The apparatus includes a pivotably mounted frame assembly having a pair of projecting transfer arms. The transfer arms are provided with a clamping mechanism for clamping the wood frame therebetween at the first surface. It is transferred to the second surface by rotating the frame assembly about its pivot axis and then releasing the clamping mechanism when the frame is at or just above the second surface. The clamping mechanism includes at least one structure which is pivotably mounted to the end of one of the transfer arms and movable in the direction of the other of the two arms.

18 Claims, 6 Drawing Figures

APPARATUS FOR TRANSPORTING FRAMES

BACKGROUND OF THE INVENTION

1. Field of the Invention

The field of the invention relates to an apparatus for transporting a pallet or frame from one location to another.

2. Brief Description of the Prior Art

In the manufacture of boxspring frames, it is common practice to mount a plurality of wood members upon a rack so that they may be stapled together. A frame assembled in this manner may then be transported to another station where its four corners may be rounded. Since the frames are of considerable weight, particularly if one person must handle a large number of them on a daily basis, it is desirable to transport them in a manner requiring a minimum of physical exertion.

SUMMARY OF THE INVENTION

An automatic unloading apparatus is provided for lifting a frame or pallet from a first station and depositing it at a second station.

In accordance with a particular embodiment of the invention, an apparatus is provided for lifting a boxspring frame from a stapling rack and depositing it on a conveyor where it will be transported to a routing apparatus.

The apparatus includes a clamping assembly for clamping the ends of a frame once it has been stapled together. The clamping assembly is comprised of a pair of parallel transfer arms to which clamping means are secured. At least one of the clamping means is movable towards the other.

The parallel transfer arms are secured to a frame which is pivotable about a shaft. The shaft is rotated by a motor to cause the transfer arms to move to their appropriate positions. Due to the weight of the arms and the boxspring frame carried thereby, counterbalancing means are provided on the frame structure to reduce the work load of the motor and stress upon certain components of the unloading apparatus.

Three limit switches are provided where the apparatus is used to transfer a boxspring frame from a stapling rack to a conveyor. The first switch limits the travel of the transfer arms in the forward direction, i.e. towards the rack. The second stops the arms when the boxspring frame is adjacent the conveyor. A rest position intermediate the forward and rear positions is provided by the third switch. This allows the stapling operation to be conducted on the rack while frames from other unloading apparatuses pass by on the conveyor.

DETAILED DESCRIPTION OF THE INVENTION

Figure 1:
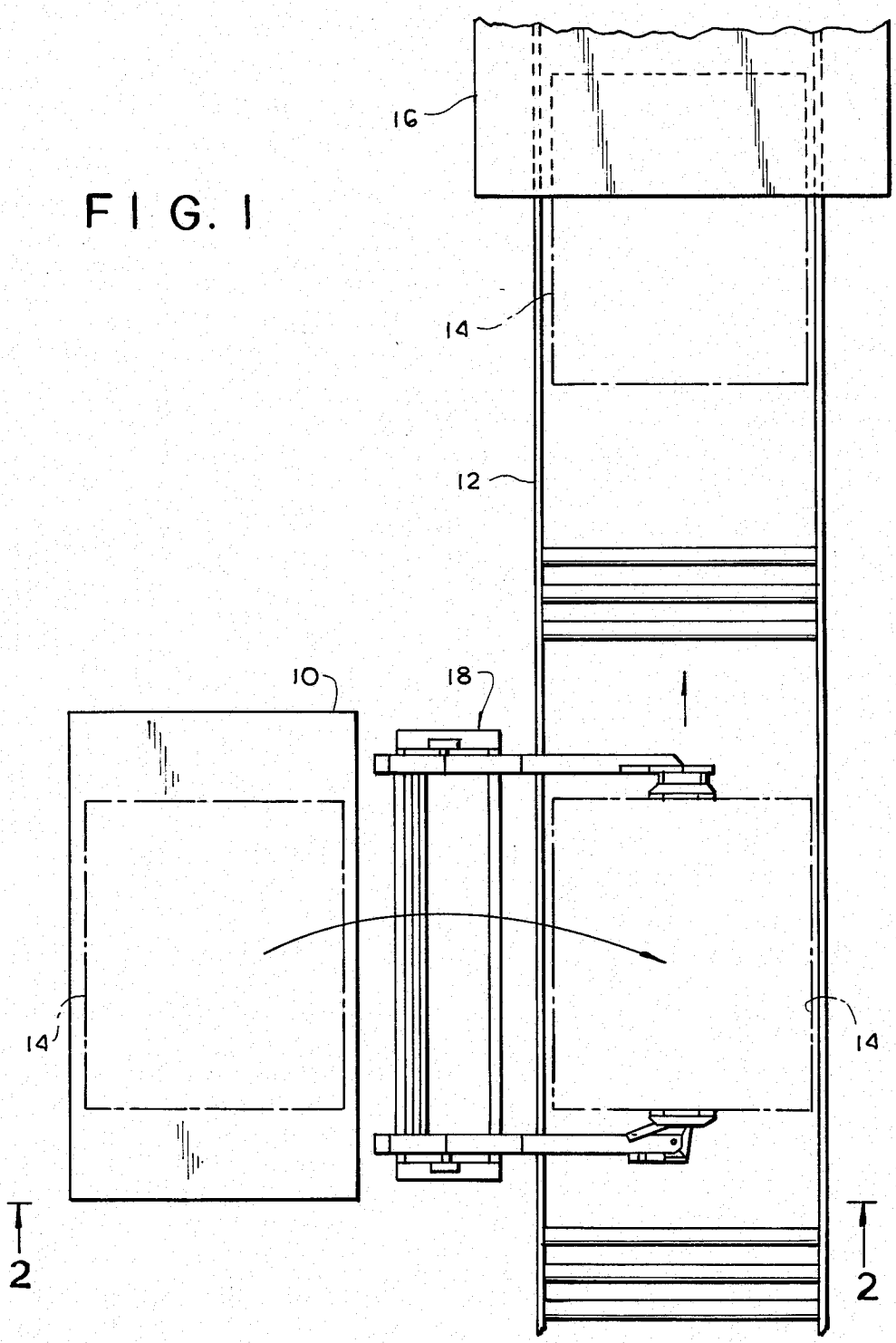
FIG. 1 is a schematical plan view of a transporting apparatus employed within a boxspring frame manufacturing system.
Figure 2:
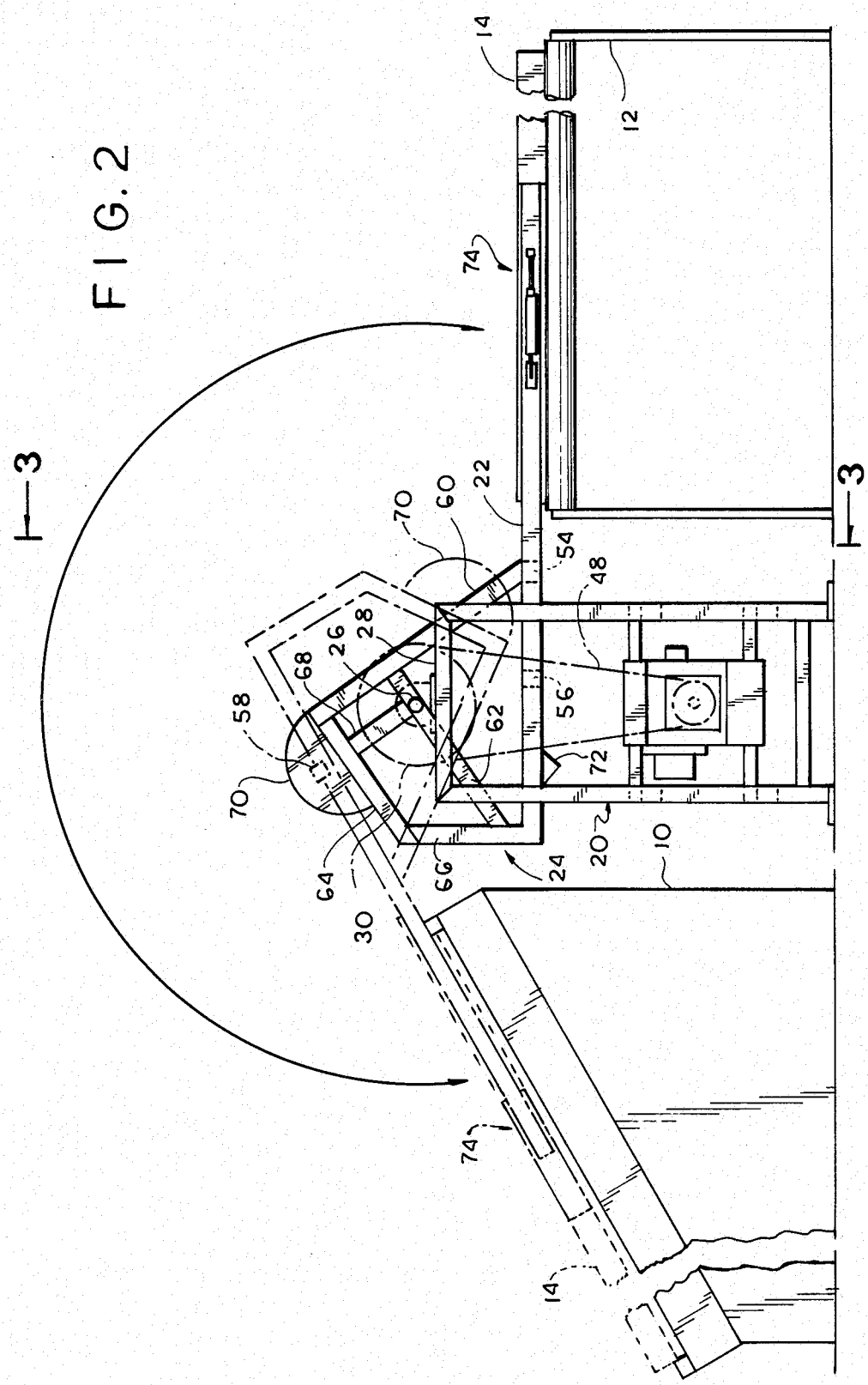
FIG. 2 is a side elevation view of a transporting apparatus according to the invention.
Figure 3:
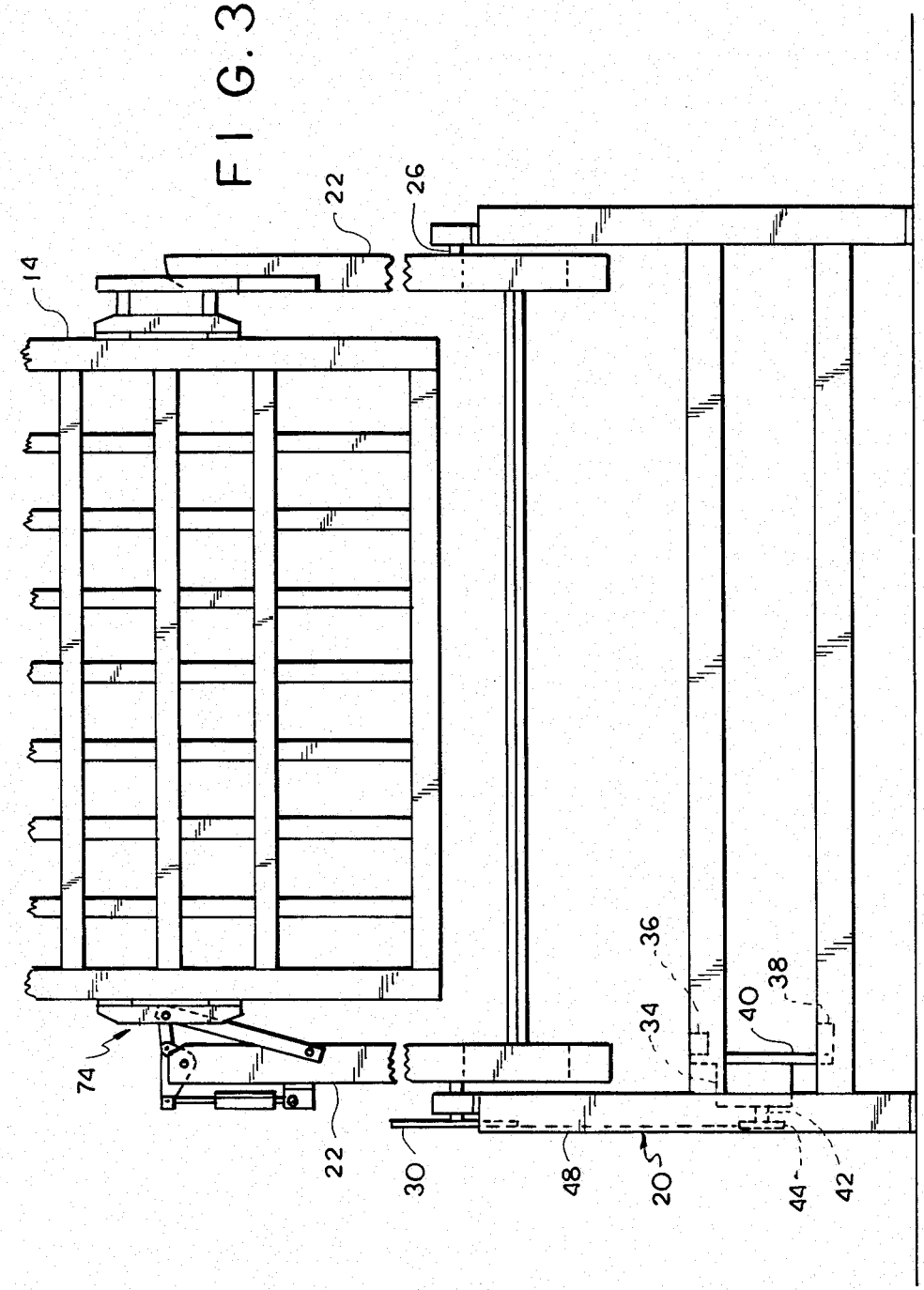
FIG. 3 is a front view taken along the plane of line 3—3 of FIG. 2.
Figure 4:
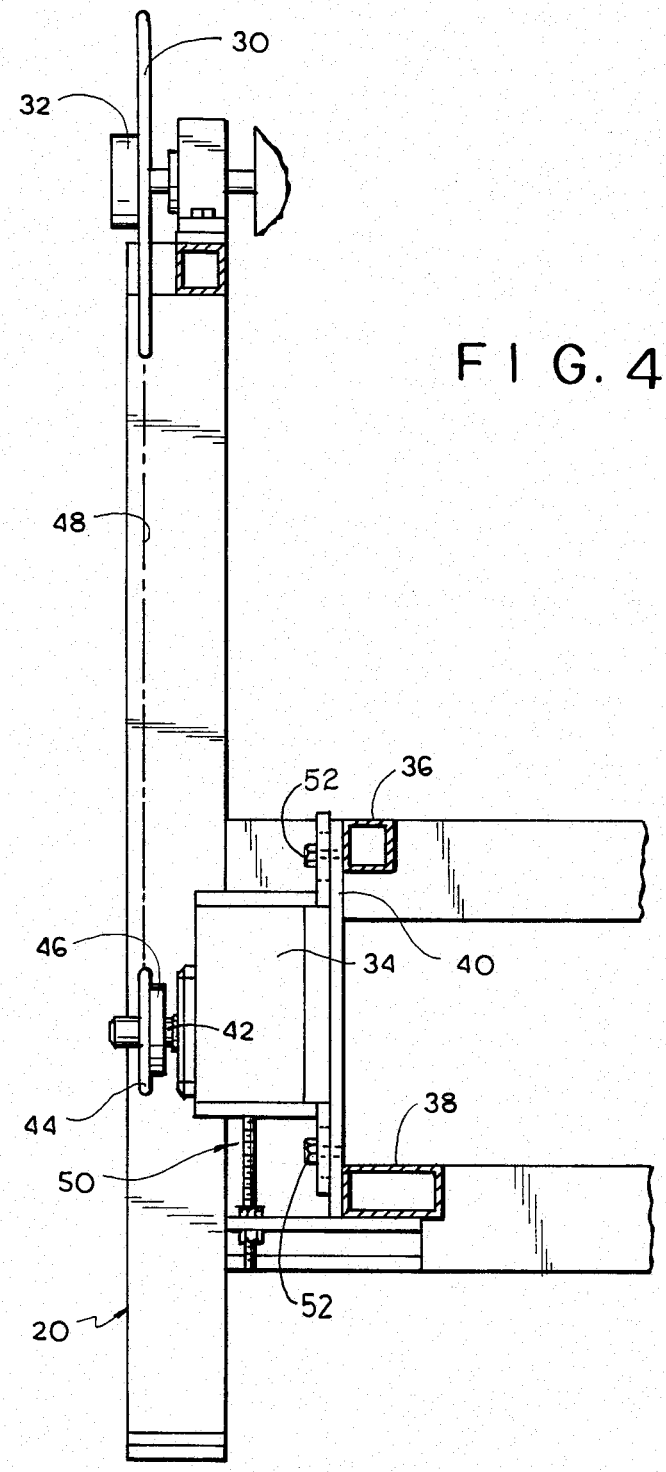
FIG. 4 is a front view of a portion of the transporting apparatus shown in greater detail.

A system is provided wherein a boxspring frame may be stapled together, loaded onto a conveyor, and transported to another station for further processing in nearly an entirely automatic procedure. The system reduces both the labor involved in handling boxspring frames and the possibility of injury. Efficiency is also enhanced.

A stapling rack 10 is provided upon which the individual members of a boxspring frame may be assembled. The rack includes the appropriate pegs and slots normally associated with such structures to allow the wood members to be correctly positioned and then stapled. The staple gun used in this procedure may be slidably supported by a frame for the convenience of the operator.

A conveyor 12 is provided for transporting assembled boxspring frames 14 to a station for further processing. The station may include a router 16 for rounding the corners of the frame. Springs and other materials may be assembled to the frame at a further station once it passes through the router.

An unloading apparatus 18 is positioned between the stapling rack 10 and the conveyor 12. In practice, a plurality of stapling racks and unloading apparatuses may be employed in conjunction with a single conveyor. The apparatus 18 is mounted to a support structure 20 made from rectangular tubing. The support structure is bolted or otherwise firmly secured to the floor.

The unloading apparatus 18 includes a pair of transfer arms 22 mounted to a frame assembly 24. The frame assembly 24 is pivotally mounted to the support structure 20 by means of an axle 26 welded thereto. The axle extends through a cylindrical bore within a support piece bolted to a horizontal cross piece 28 of structure 20.

A relatively large sprocket 30 is provided for causing the frame assembly 24 to oscillate about the axis defined by the axle 26. The axle passes through the center of the sprocket 30. A retaining ring 32 is mounted to the axle 26 and adjoins the sprocket.

A reversible air motor 34 is mounted to a pair of horizontal cross pieces 36, 38 of the support structure 20 by means of a support plate 40. The motor 34 drives a shaft 42 having a relatively small sprocket 44 secured thereto. A retaining ring 46 is also mounted to the shaft.

The small sprocket 44 is connected to the large sprocket 30 by means of a chain 48. In the embodiment illustrated herein, the large sprocket includes about three times as many teeth as the small. Means 50 including jack screws 52 are provided for adjusting the tension of the chain.

The frame assembly 24 includes two opposing substantially symmetrical end portions, one of which is welded to the axle 26. The end portions are connected by first, second, and third cross bars 54, 56, 58 which also serve to reduce the torque on the axle. As seen from the side elevation view thereof, each end portion includes a plurality of rectangular tube members and counterweights.

A first tube member 60 is joined at right angles with second and third tube members 62, 64. The axle 26 is immovably secured to the second tube member 62. A fourth tube member 66 adjoins the ends of the second and third tube members and extends slightly beyond the end of the second member 62. It there adjoins one of the transfer arms 22 forming a right angle therewith. The first tube member 60 is also connected to the transfer arm 22 forming about a 55° angle therewith. A fifth tube member 68 extends between the second and third tube members and is perpendicular thereto.

A pair of counterweights 70, 72 are provided for counterbalancing at least a portion of the weight of the transfer arms 22 and preferably at least the entire weight of said arms. It is desirable to maintain the moment about the axle 26 as near zero as possible when a boxspring frame 14 is supported by the transfer arms 22. This minimizes the work which has to be performed by the motor 34 and the stresses upon the various components of the unloading apparatus. The counterweights may have any desired size, shape and position depending upon the requirements of the apparatus.

At least one of the transfer arms 22 is provided with an adjustable clamping mechanism 74 near an end thereof. The other arm may include either an adjustable mechanism or simply one or more pads for gripping an end of a boxspring frame.

Figure 5:
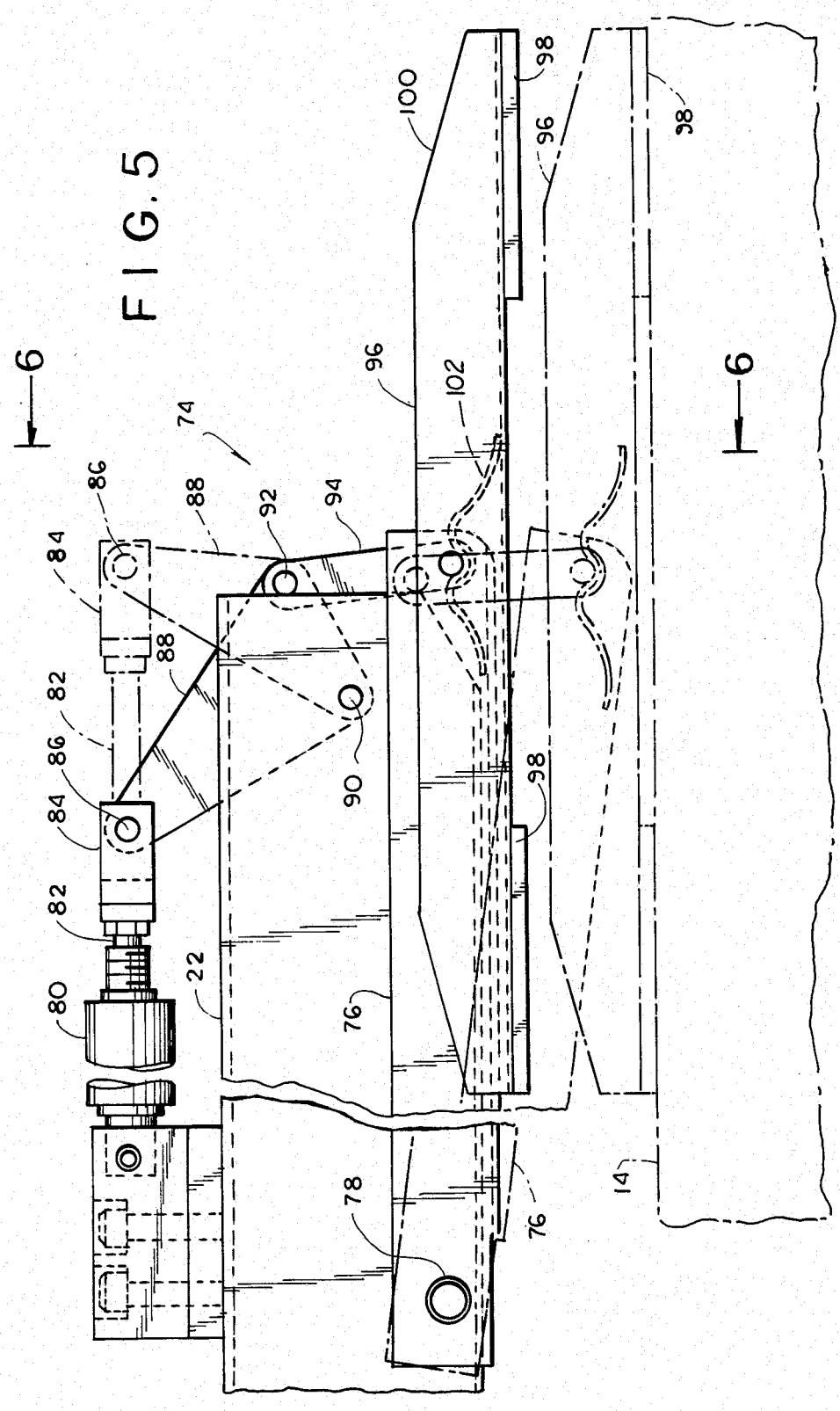
FIG. 5 is a side elevation view of a transfer arm assembly.
Figure 6:
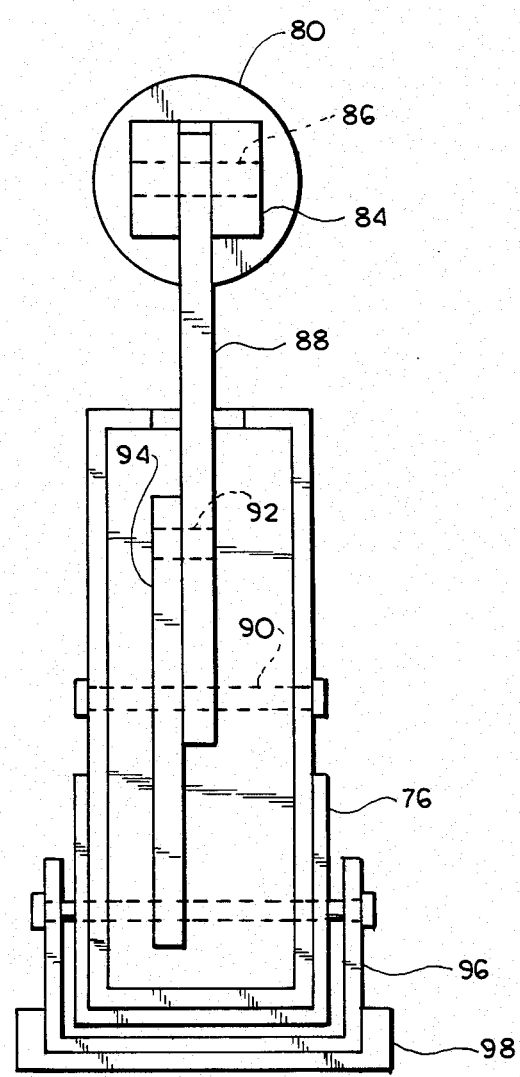
FIG. 6 is a front view of the transfer arm assembly taken along the plane of line 6—6 in FIG. 4.

The adjustable mechanism 74 includes a linkage arm 76 having one end pivotably secured to the transfer arm 22 by a pivot pin 78. An air cylinder 80 is pivotably mounted to the opposite side of the transfer arms. It includes a piston rod 82 having a clevis 84 mounted thereto. A pin 86 extends through the clevis and supports one end of a ninety degree link 88. The link 88 is triangular in shape and includes a hole near each corner thereof. One hole receives pin 86. The second receives a second pivot pin 90 which also extends through the transfer arm 22. The third receives a third pivot pin 92 which also extends through a hole formed in one end of an elongate connecting link 94. The opposite end of the connecting link 94 is pivotably connected to a swivel arm 96 near the center portion of the latter and the linkage arm 76. A pair of pick-up pads 98 are secured to the swivel arm for contacting the end of a boxspring frame. The swivel arm 96 includes tapered end portions 100 and a U-shaped cross section which encloses a portion of the linkage arm 76. The linkage arm 76 also has a U-shaped cross-section which encloses a portion of the transfer arm 22. A leaf spring 102 is provided for holding the swivel arm 96 parallel to the transfer arm 22 while in the rest position shown in solid lines in FIG. 5. The arm 96 will be restrained from moving counter-clockwise about its pivotable connection to link 94 by a portion of this spring.

Control means are provided for actuating the various moving parts of the unloading apparatus 18. The transfer arms 22 may assume any of three different stationary positions due to the provision of limit switches associated with the control means. The piston rod 82 is caused to move back or forth depending upon the position of the transfer arms.

In operation, the individual wood member which comprise a boxspring frame are mounted to the stapling rack 10 when they are stapled together to provide an integral structure. Once the staple gun is removed from the vicinity of the rack, the transfer arms are caused to move about the axis of axle 26 to a point just above the surface of the rack. Upon reaching this point, pressurized air is supplied to the air cylinder to cause the piston rod 82 to move outwardly. It is apparent from FIG. 5 that such movement of the piston rod will cause the linkage arm 76 to move about pivot pin 78 in a direction away from the transfer arm 22. This in turn causes the swivel arm to move toward the boxspring frame 14 until the pickup pads 98 make contact therewith. A six inch stroke of the piston rod 82 is responsible for about a two inch movement of the swivel arm 96. The frame 14 is pushed towards the opposing transfer arm 22 until it is firmly clamped therebetween.

Once the frame is clamped the air motor 34 is actuated by the control means to cause the unloading apparatus to rotate about axle 26. When the frame reaches the vicinity of the conveyor surface, a limit switch is actuated causing the motor to stop and the piston rod to retract. The frame is accordingly dropped on the conveyor where it is carried away for further processing. To allow frames to pass without interference from the transfer arms, the motor 34 is again actuated once the clamping mechanism is released and the apparatus 18 is rotated to a rest position.

To accomodate frames of smaller lengths, an extension may be welded to the swivel arm. Although one apparatus could be constructed to accomodate frames of various lengths, this is unnecessary where a plurality of stapling racks and unloading apparatuses are employed. Since boxspring frames are traditionally one of two lengths, selected numbers of racks and unloading apparatuses can be used to handle frames of each length.

What is claimed is:

1. An apparatus for transporting an item from a first station to a second station, comprising:
   a frame assembly;
   first and second substantially parallel transfer arms mounted to said frame assembly and extending therefrom;
   means for moving said frame assembly back and forth about an axis, thereby causing said transfer arms to traverse an arcuate path;
   counterbalancing means mounted to said frame assembly for counterbalancing at least a portion of the weight of said transfer arms; and
   first and second clamping means respectively mounted near the ends of said first and second transfer arms, said clamping means opposing each other and positioned a desired distance from said frame assembly;
   at least one of said clamping means including a linkage arm pivotably mounted to one of said transfer arms, a swivel arm pivotably mounted to said linkage arm, and means for moving said linkage arm about the point at which it is pivotably mounted to said one of said transfer arms, thereby moving said swivel arm towards or away from said one of said transfer arms to grip or release an item positioned between said transfer arms;
   said linkage arm and said swivel arm both having a U-shaped cross-sectional configuration, said linkage arm partially enclosing said one of said transfer arms and said swivel arm partially enclosing said linkage arm.

2. An apparatus as defined in claim 1 including a cylinder mounted to said one of said transfer arms, a piston rod positioned within and partially extending from said cylinder; means for moving said piston rod back and forth along the axis of said cylinder; and a connection linkage assembly pivotably mounted between said piston rod and said linkage arm.

3. An apparatus as defined in claim 2 wherein said connection linkage assembly includes a first link pivotably mounted to said piston rod and said transfer arm, and a connecting link pivotably connecting said first link with said linkage arm.

4. An apparatus as defined in claim 1 including spring means mounted between said linkage arm and said swivel arm, said spring means resisting movement of said swivel arm about the point at which it is pivotably mounted to said linkage arm.

5. An apparatus as defined in claim 1 wherein said swivel arm includes at least one pad mounted thereon.

6. An apparatus as defined in claim 1 including:
an axle, said frame assembly being mounted to said axle;
a relatively large sprocket, said axle being mounted to the center of said sprocket;
a relatively small sprocket;
a chain connecting said relatively small sprocket to said relatively large sprocket; and
a motor for rotating said relatively small sprocket.

7. An apparatus as defined in claim 1 wherein said linkage arm has a first end which is pivotably mounted to said one of said transfer arms, said swivel arm being pivotably mounted near the center portion thereof to said linkage arm a selected distance from said first end.

8. An apparatus as defined in claim 1 wherein said counterbalancing means counterbalances more than the weight of said transfer arms.

9. A system for processing and handling a wood frame or the like, comprising:
a rack having a surface capable of supporting a wood frame or the like;
a conveyor positioned adjacent to said rack; and
an apparatus for transferring a frame from said rack to said conveyor, said apparatus including: a frame assembly; a pair of transfer arms mounted to said frame assembly and extending therefrom; means for moving said frame assembly back and forth about an axis, thereby causing said transfer arms to traverse an arcuate path; clamping means mounted to each of said transfer arms, said clamping means opposing each other and positioned a selected distance from said frame assembly; and means for moving at least one of said clamping means towards or away from the transfer arm to which it is mounted to grip or release an item positioned between said transfer arms; said transfer arms being of sufficient length to allow said clamping means to clamp a frame supported by said rack and deposit it upon said conveyor upon travelling said arcuate path; at least one of said clamping means including a linkage arm pivotably mounted to one of said transfer arms, a swivel arm pivotably mounted to said linkage arm, and means for moving said linkage arm about the point at which it is pivotably mounted to said one of said transfer arms; said linkage arm and said swivel arm both having a U-shaped cross-sectional configuration, said linkage arm partially enclosing said one of said transfer arms and said swivel arm partially enclosing said linkage arm.

10. A system as defined in claim 9 including counterbalancing means mounted to said frame assembly, said counterbalancing means counterbalancing at least the weight of said transfer arms.

11. A system as defined in claim 9 wherein said rack is a stapling rack.

12. A system as defined in claim 9 including a cylinder mounted to said one of said transfer arms, a piston rod positioned within and partially extending from said cylinder; means for moving said piston rod back and forth along the axis of said cylinder; and a connection linkage assembly pivotably mounted between said piston rod and said linkage arm.

13. An apparatus as defined in claim 12 wherein said connection linkage assembly includes a first link pivotably mounted to said piston rod and said transfer arm, and a connecting link pivotably connecting said first link with said linkage arm.

14. A system as defined in claim 9 including spring means mounted between said linkage arm and said swivel arm, said spring means resisting movement of said swivel arm about the point at which it is pivotably mounted to said linkage arm.

15. A system as defined in claim 9 wherein said swivel arm includes at least one pad mounted thereon.

16. A system as defined in claim 9 including:
an axle, said frame assembly being mounted to said axle;
a relatively large sprocket, said axle being mounted to the center of said sprocket;
a relatively small sprocket,
a chain connecting said relatively small sprocket with said relatively large sprocket; and
a motor for rotating said relatively small sprocket.

17. A system as defined in claim 9 wherein said linkage arm has a first end which is pivotably mounted to said one of said transfer arms, said swivel arm being pivotably mounted near the center portion thereof to said linkage arm a selected distance from said first end.

18. An apparatus for transporting an item from a first station to a second station, comprising:
a frame assembly;
first and second substantially parallel transfer arms mounted to said frame assembly and extending therefrom;
means for moving said frame assembly back and forth about an axis, thereby causing said transfer arms to traverse an arcuate path;
counterbalancing means mounted to said frame assembly for counterbalancing at least a portion of the weight of said transfer arms;
first and second clamping means respectively mounted near the ends of said first and second transfer arms, said clamping means opposing each other and positioned a desired distance from said frame assembly, at least one of said clamping means including a linkage arm pivotably mounted to one of said transfer arms, a swivel arm pivotably mounted to said linkage arm, and means for moving said linkage arm about the axis at which it is pivotably mounted to said one of said transfer arms, thereby moving said swivel arm towards or away from said one of said transfer arms; and
spring means mounted between said linkage arm and said swivel arm, said spring means resisting movement of said swivel arm about the axis at which it is pivotably mounted to said linkage arm.

* * * * *